United States Patent
Soga et al.

(10) Patent No.: US 11,647,769 B2
(45) Date of Patent: May 16, 2023

(54) DEVICE FOR MICROWAVE AGING AND METHOD FOR MICROWAVE AGING

(71) Applicant: Shikoku Instrumentation CO., LTD., Kagawa (JP)

(72) Inventors: Hirofumi Soga, Nakatado-gun (JP); Katsuyuki Kunii, Nakatado-gun (JP); Eiji Kagawa, Nakatado-gun (JP); Tsubasa Ogawa, Takamatsu (JP)

(73) Assignee: SHIKOKU INSTRUMENTATION CO., LTD., Kagawa (JP)

( * ) Notice: Subject to any disclaimer, the term of this patent is extended or adjusted under 35 U.S.C. 154(b) by 518 days.

(21) Appl. No.: 16/651,465

(22) PCT Filed: Nov. 7, 2018

(86) PCT No.: PCT/JP2018/041313
§ 371 (c)(1),
(2) Date: Mar. 27, 2020

(87) PCT Pub. No.: WO2019/093365
PCT Pub. Date: May 16, 2019

(65) Prior Publication Data
US 2020/0268025 A1 Aug. 27, 2020

(30) Foreign Application Priority Data
Nov. 8, 2017 (JP) .............................. JP2017-215296

(51) Int. Cl.
*A61L 2/00* (2006.01)
*A23L 3/00* (2006.01)
(Continued)

(52) U.S. Cl.
CPC .................. *A23L 5/34* (2016.08); *H05B 6/68* (2013.01); *H05B 6/80* (2013.01)

(58) Field of Classification Search
CPC .... H05B 6/22; H05B 6/67; A21B 1/48; A61L 2/0064; A61L 2/12
(Continued)

(56) References Cited

U.S. PATENT DOCUMENTS

| 4,436,973 A * | 3/1984 | Ikeda ..................... H05B 6/642 219/751 |
| 2007/0031281 A1* | 2/2007 | Stevens ..................... A23L 3/28 422/24 |
| 2015/0366006 A1 | 12/2015 | Ben-Shmuel et al. |

FOREIGN PATENT DOCUMENTS

| JP | 2002-090052 A | 3/2002 |
| JP | 2003-21340 A | 1/2003 |
| JP | 2015-123057 A | 7/2015 |

OTHER PUBLICATIONS

Otsuka, Ken-ichi, "Artificial Aging Techniques for Distilled Liquor", Brewing Society of Japan, vol. 60, No. 6, pp. 24-27, with Partial English Translation; cited in the Specification (5 pages).
(Continued)

*Primary Examiner* — Monzer R Chorbaji
(74) *Attorney, Agent, or Firm* — WHDA, LLP

(57) ABSTRACT

Problem: To provide a microwave aging device that can shorten the time required for ageing food and can improve a yield rate.
Solution: There is provided a microwave aging device including: a microwave aging unit 30, having an aging chamber configured to store food, an irradiation port through which microwave irradiation is performed into the aging chamber, and a blower fan configured to blow air into the aging chamber; a cooling unit 10 having a cooling chamber that is cooled by a cooler; a microwave oscillating unit 20 connected to the irradiation port; and a controller 40, where the aging chamber is arranged in the cooling chamber. There is also provided a microwave aging method using the device.

17 Claims, 10 Drawing Sheets

EMBODIMENT EXAMPLE USING OLIVE OIL

COMPARISON

MICROWAVE AGING
IN OLIVE OIL

TYPICAL AGING
(COVERED WITH PLASTIC WRAP)

(51) Int. Cl.
  *H05B 6/70* (2006.01)
  *H05B 6/66* (2006.01)
  *A23L 5/30* (2016.01)
  *H05B 6/68* (2006.01)
  *H05B 6/80* (2006.01)

(58) Field of Classification Search
  USPC ............. 422/21, 24; 99/443 C; 219/692, 703
  See application file for complete search history.

(56) References Cited

OTHER PUBLICATIONS

Supplementary European Search Report dated Nov. 9, 2020, issued in counterpart EP Application No. 18 87 6534. (1 page).
Office Action dated Jul. 25, 2022, issued in counterpart TW Application No. 107139695. (4 pages).
Search Report dated Jul. 25, 2022, issued in counterpart TW Application No. 107139695, with English translation. (2 pages).
Office Action dated Sep. 13, 2022, issued in counterpart JP Application No. 2019-552344, with English Translation. (8 pages).
Office Action dated Oct. 21, 2022, issued in counterpart AU Application No. 2018363945. (3 pages).

* cited by examiner

[Fig.1]
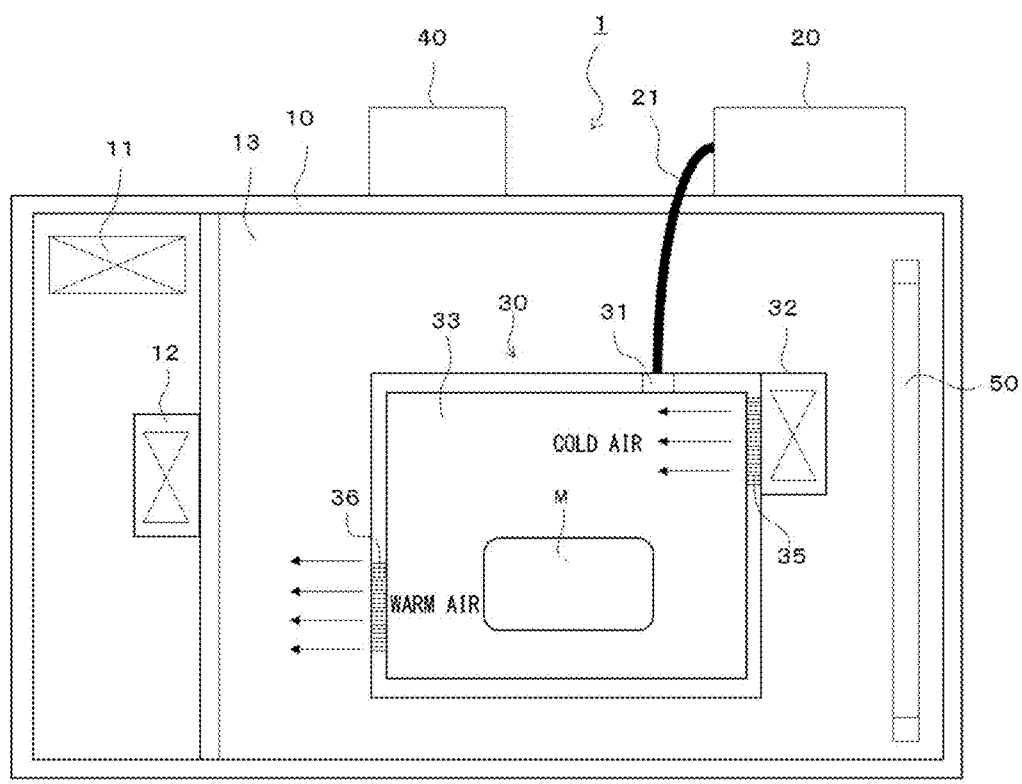

[Fig.2]
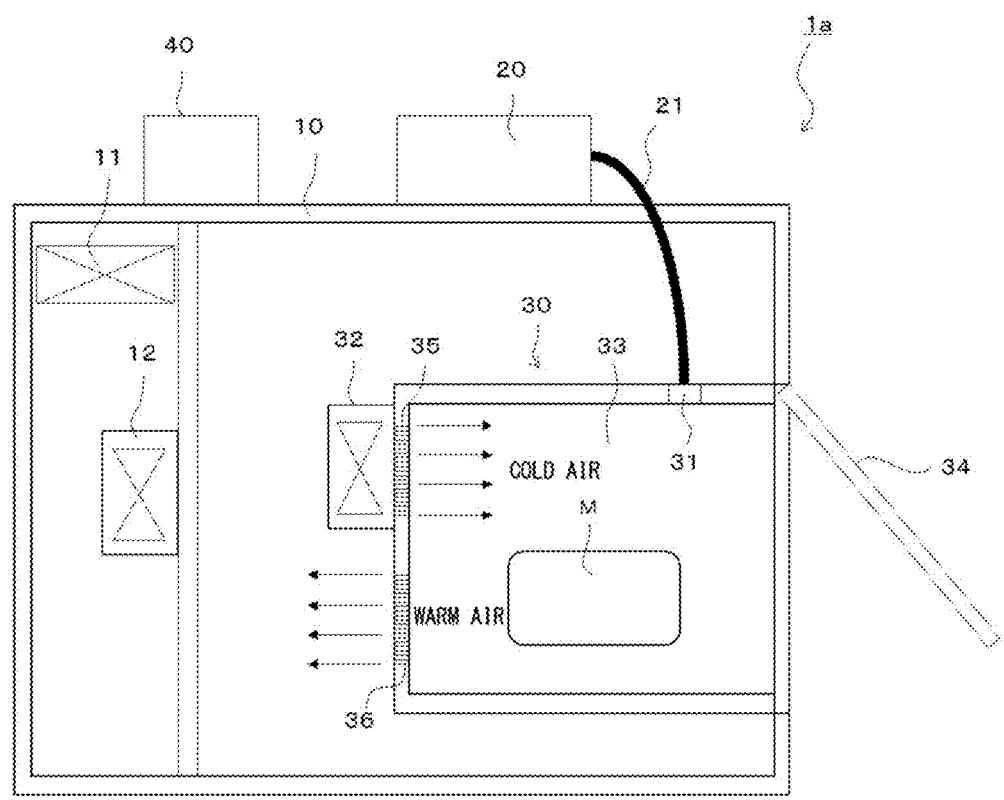

[Fig.3]
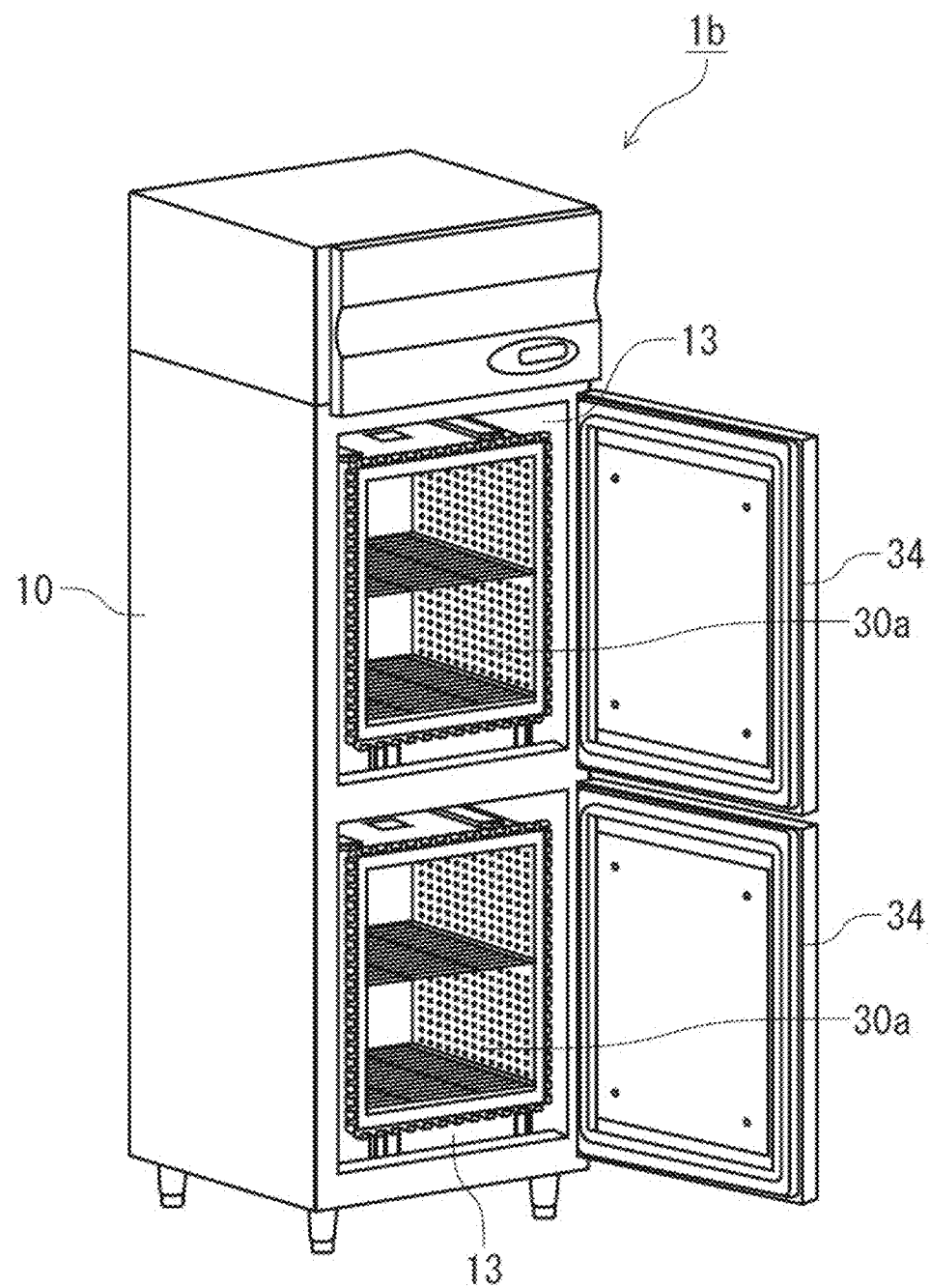

[Fig.4]
(A)
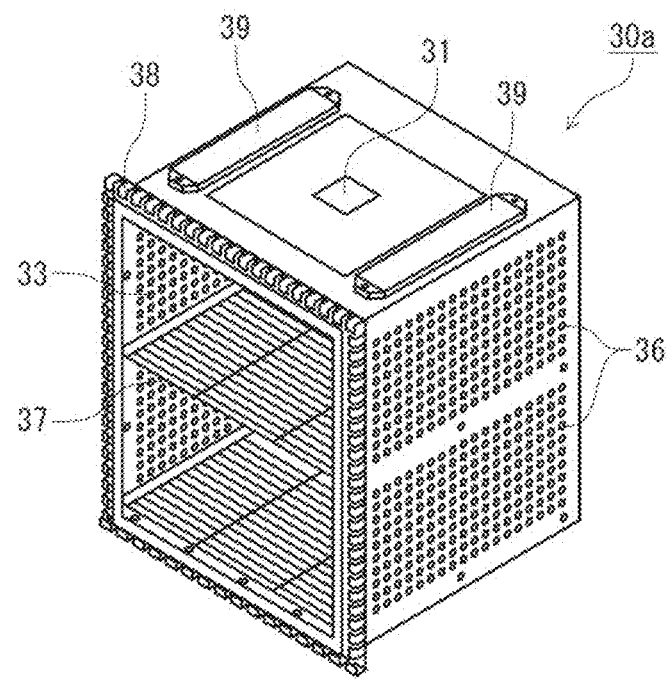
(B)
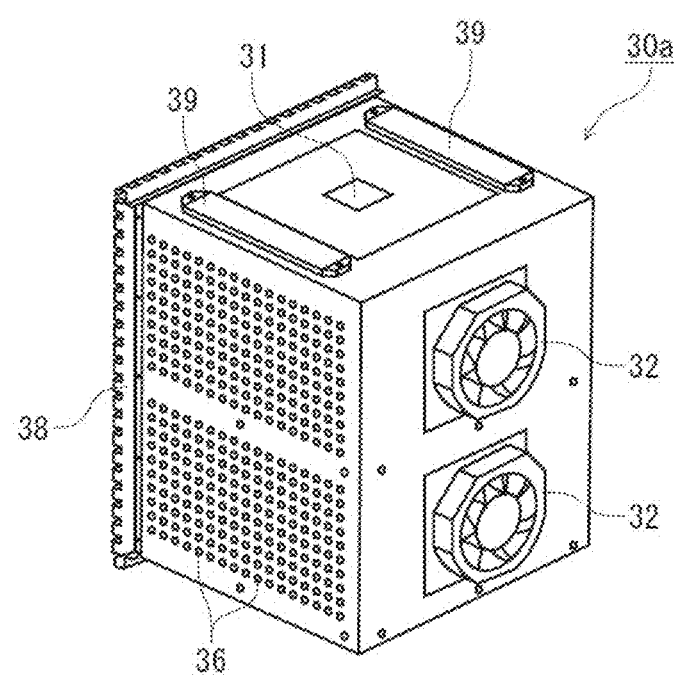

[Fig.5]
|    |               | 0TH DAY | 1ST DAY | 3RD DAY | 6TH DAY | 7TH DAY | 9TH DAY |
|----|---------------|---------|---------|---------|---------|---------|---------|
| 1  | ASPARTIC ACID | 3.9     | 5.2     | 4       | 10.1    | 9.1     | 11      |
| 2  | THREONINE     | 16.9    | 19.7    | 19.9    | 38.1    | 44.5    | 59      |
| 3  | SERINE        | 21.9    | 25.4    | 26.7    | 47.8    | 55.5    | 70.6    |
| 4  | GLUTAMIC ACID | 32.1    | 36.8    | 39      | 69.8    | 83.4    | 115.3   |
| 5  | GLYCINE       | 14      | 15.4    | 18.3    | 30.6    | 36.6    | 48.1    |
| 6  | ALANINE       | 48.4    | 51.8    | 61.8    | 99      | 115.8   | 145.5   |
| 7  | VALINE        | 28.6    | 33.1    | 32.4    | 58.6    | 69.8    | 88.2    |
| 8  | CYSTINE       | 0       | 0       | 0       | 0       | 0       | 0       |
| 9  | METHIONINE    | 19.4    | 22.2    | 20.1    | 32.9    | 39.1    | 46.2    |
| 10 | ISOLEUCINE    | 23.1    | 26.9    | 27.2    | 43.9    | 53.2    | 65.3    |
| 11 | LEUCINE       | 39.6    | 46.5    | 44.6    | 75.9    | 94.6    | 114.9   |
| 12 | TYROSINE      | 24.1    | 27.5    | 23.8    | 38.6    | 43.9    | 52.7    |
| 13 | PHENYLALANINE | 23.5    | 27.3    | 26.3    | 40.8    | 49.9    | 61.5    |
| 14 | TRYPTOPHAN    | 4.8     | 9.7     | 8.7     | 12.4    | 10.1    | 14.4    |
| 15 | LYSINE        | 30.3    | 33.6    | 32.1    | 63.9    | 75.1    | 105.1   |
| 16 | HISTIDINE     | 9.6     | 10.5    | 10.2    | 18.6    | 21      | 30.6    |
| 17 | ARGININE      | 28.8    | 33      | 28.9    | 50.3    | 57.5    | 72.7    |
| 18 | PROLINE       | 6.4     | 7.2     | 6.3     | 14.6    | 17.4    | 27      |
|    | INOSINIC ACID | 37.84   | 41.16   | 44.04   | 74.50   | 91.05   | 112.81  |
(UNIT mg/100 g)
[Fig.6]
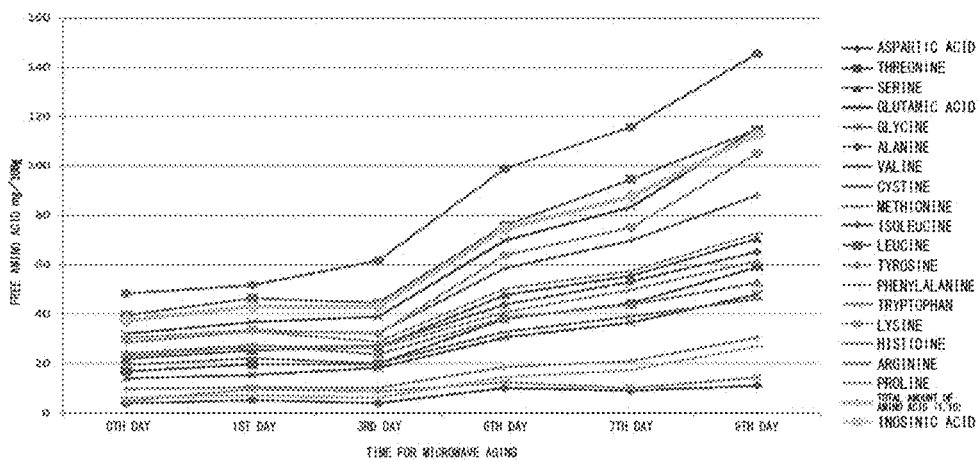

[Fig.7]

| | | (A) | (B) | (C) | (D) |
|---|---|---|---|---|---|
| | | NO AGING | MW: 0HRS →7 DAYS TYPICAL AGING | MW: 6HRS →6 DAYS + 18 HRS TYPICAL AGING | MW: 20HRS →6 DAYS + 4 HRS TYPICAL AGING |
| 1 | ASPARTIC ACID | 0.9 | 1.1 | 2.9 | 4.9 |
| 2 | THREONINE | 5.7 | 7.9 | 10.8 | 19.5 |
| 3 | SERINE | 7.9 | 11.6 | 14.4 | 24.2 |
| 4 | GLUTAMIC ACID | 10.3 | 15.7 | 20.1 | 35.5 |
| 5 | GLYCINE | 8.1 | 11.1 | 11.2 | 20.1 |
| 6 | ALANINE | 23.3 | 31.3 | 32.5 | 54.7 |
| 7 | VALINE | 10.6 | 14.2 | 18.6 | 30.7 |
| 8 | CYSTINE | 0 | 0 | 1.8 | 2.1 |
| 9 | METHIONINE | 10.2 | 12.5 | 12.4 | 18.3 |
| 10 | ISOLEUCINE | 11.3 | 12.9 | 15.9 | 24.5 |
| 11 | LEUCINE | 16.7 | 21 | 27 | 42.7 |
| 12 | TYROSINE | 7.8 | 10.5 | 14.9 | 11.9 |
| 13 | PHENYLALANINE | 10.4 | 12.7 | 16.8 | 25.6 |
| 14 | TRYPTOPHAN | 1.9 | 1.9 | 3.1 | 4.1 |
| 15 | LYSINE | 9.6 | 11.8 | 17.9 | 26.9 |
| 16 | HISTIDINE | 3.4 | 4 | 5.7 | 9.3 |
| 17 | ARGININE | 8.5 | 10.9 | 14.6 | 15.8 |
| 18 | PROLINE | 1.5 | 1.9 | 4 | 8.8 |
| | INOSINIC ACID | 28.8 | 23.9 | 10.6 | 6.7 |

(UNIT mg/100 g)

[Fig.8]
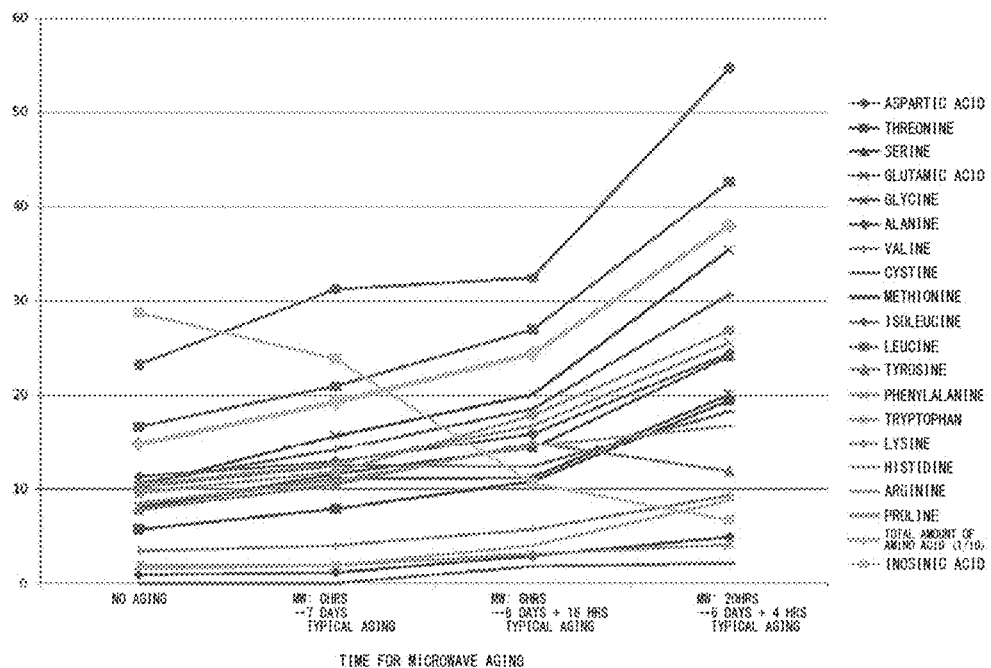
[Fig.9]
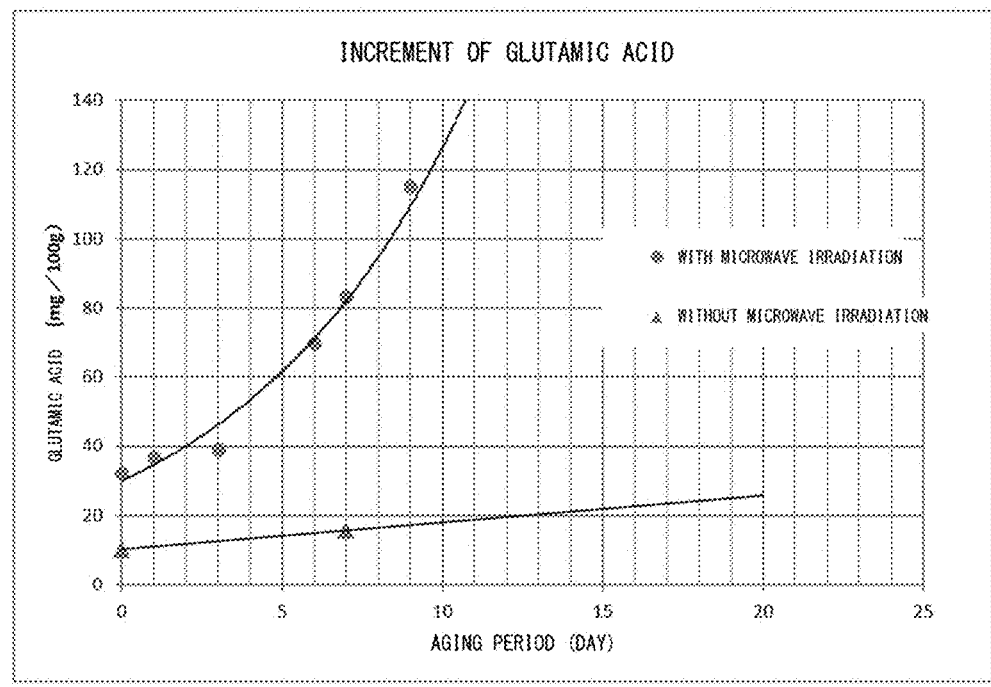

[Fig.10]
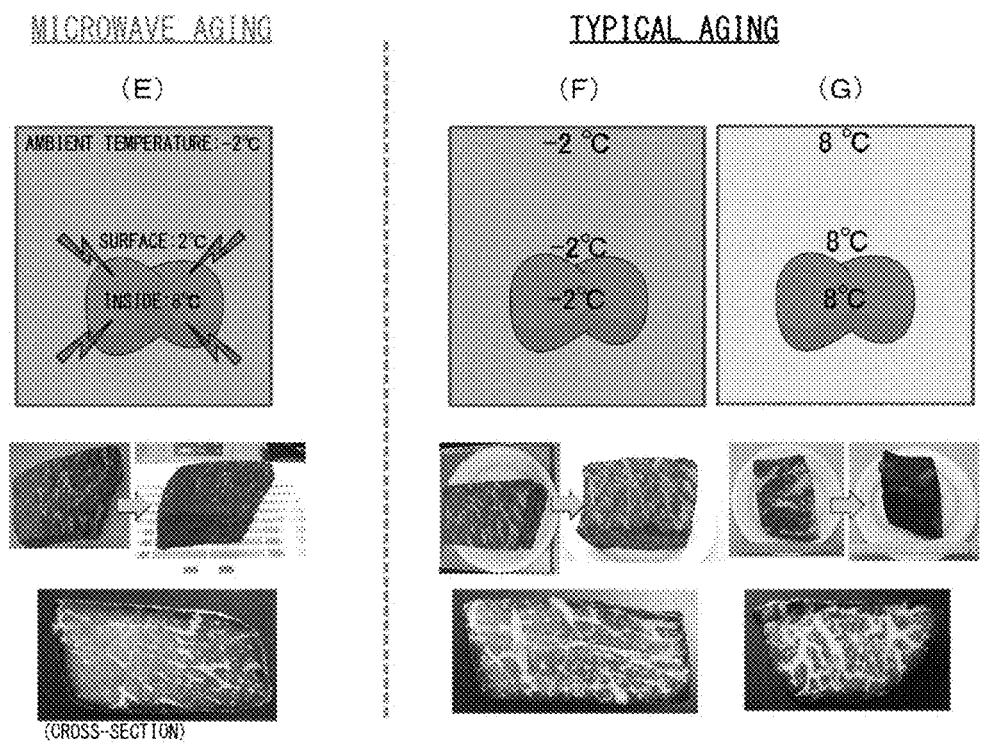

[Fig.11]
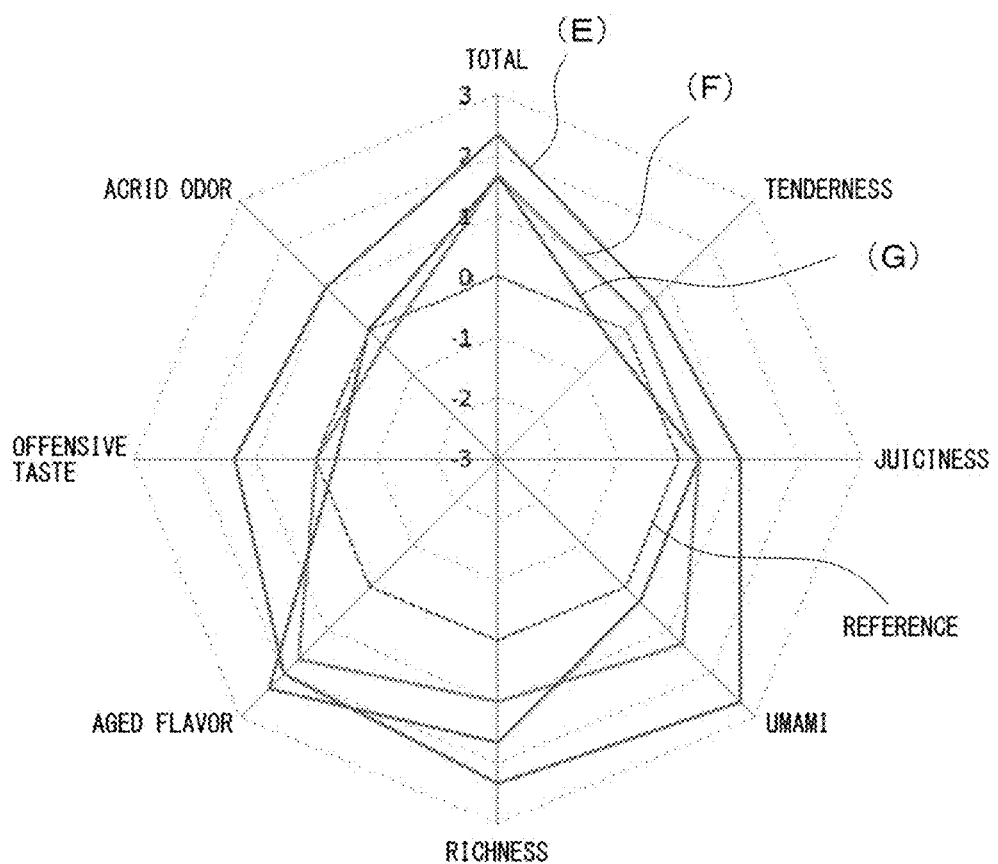

[Fig.12]
EMBODIMENT EXAMPLE USING RAW HAM
COMPARISON
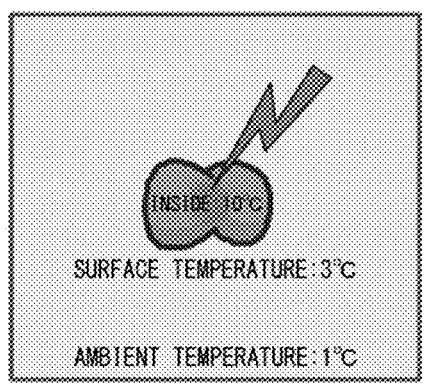 ⇔ 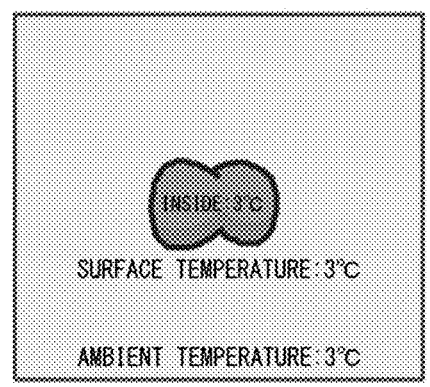
MICROWAVE AGING (COVERED WITH PLASTIC WRAP) | TYPICAL AGING (COVERED WITH PLASTIC WRAP)
[Fig.13]
EMBODIMENT EXAMPLE USING OLIVE OIL
COMPARISON
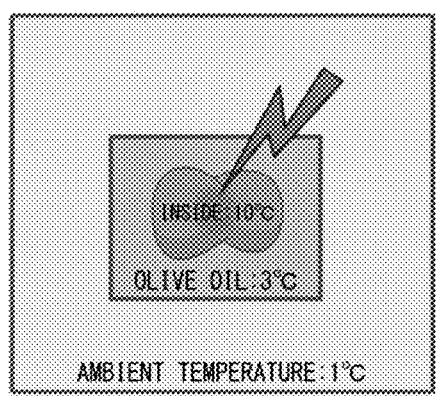 ⇔ 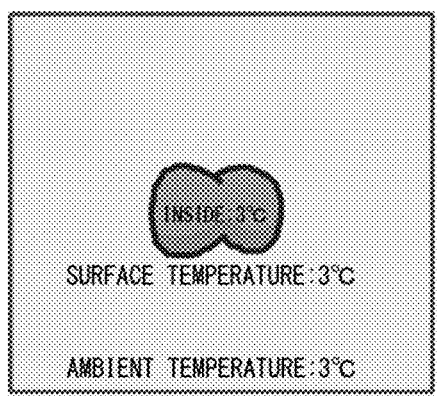
MICROWAVE AGING IN OLIVE OIL | TYPICAL AGING (COVERED WITH PLASTIC WRAP)

DEVICE FOR MICROWAVE AGING AND METHOD FOR MICROWAVE AGING

CROSS-REFERENCE TO RELATED APPLICATION

This application is a National Phase Application filed under 35 U.S.C. § 371 of International Application No. PCT/JP2018/041313 filed on Nov. 7, 2018 which claims the benefit of priorities under 35 U.S.C. § 119(a) of Japanese Patent Application No. 2017-215296 filed in Japan on Nov. 8, 2017, the contents of which are incorporated herein by reference.

TECHNICAL FIELD

The present invention relates to a microwave aging device that irradiates food with a microwave to age the food and a microwave aging method.

BACKGROUND ART

Distilled spirits are rough after distillation but become mild by storage. Since natural aging requires a long period of time, various controversies aside, artificial aging methods have historically received interest. The artificial aging methods include a physical method, a chemical method, and a combination method. One of the artificial methods of aging distilled spirits is an electrical processing method by which, for example, Noguchi (1949, 1951) aged liquor using altering current with either low frequency or high frequency. Maximov (1955) executed a process using a high-frequency wave and ozone, and rum whiskey was especially improved in quality. A method of combining these methods has also been devised rather than solely using each method (see Non-Patent Document 1).

Recently, beef with umami or the like therein increased by aging for a certain period, so-called aged meat, has been widely known and grown in demand. When beef is aged, it is originally preferable to carry out aging at around 40° C. from a viewpoint of bringing out umami or the like. However, to suppress decay due to bacterial proliferation, aging at a low temperature, for example 1° C., is normally carried out (see Patent Document 1).

CITATION LIST

Patent Document

Patent Document 1: Japanese Patent Laid-Open Publication No. 2015-123057

Non-Patent Document

Non-Patent Document 1: Brewing Society of Japan, Vol. 60, No. 6, pages 24 to 27

SUMMARY OF THE INVENTION

Technical Problem

In conventional technology, since aging is carried out at such a low temperature, there has been a problem that the aging requires a long time (in a longer case, 90 to 180 days) to complete. There has been another problem that, as the aging period gets longer, decay due to bacteria proceeds from a surface even at a low temperature, an amount of surface to be pared away, that is, trimmed, thus increases, and a yield rate decreases.

An object of the present invention is to provide a microwave aging device and a microwave aging method that can shorten the time required for ageing food and can improve the yield rate.

Solution to Problem

Both microwaves and high-frequency waves are radio waves in specific frequency bands. Both are sometimes called high-frequency waves since having high frequencies. Frequencies of microwaves range from 300 MHz to 300 GHz, and frequencies of high-frequency waves range from 10 KHz to 300 MHz. Microwaves are characterized by the frequencies slightly higher than those of high-frequency waves. Both are widely utilized for communication, heating, and the like. In general, microwaves are used for heating things comparatively small in cross-sectional size and amorphous things, and high-frequency waves are used for heating things large in cross-sectional size and long things. In the present invention, a mode utilizing the range of microwaves out of high-frequency waves that are widely utilized for heating is assumed to be a preferable embodiment. Microwaves are a kind of radio waves, and radio waves are a kind of electromagnetic waves and can travel even through vacuum. Since being "waves", electromagnetic waves have two aspects of a wavelength and a frequency. Microwaves are radio waves having a wavelength in a range of 1 m to 1 mm.

A high-frequency wave aging device, preferably a microwave aging device, according to the present invention includes a high-frequency wave aging unit, preferably a microwave aging unit, having an aging chamber configured to store food, an irradiation port through which high-frequency wave irradiation, preferably microwave irradiation, is performed into the aging chamber, and a blower fan configured to blow air into the aging chamber, a cooling unit having a cooling chamber that is cooled by a cooler, a high-frequency wave oscillating unit, preferably a microwave oscillating unit, connected to the irradiation port, and a controller, where the aging chamber is arranged in the cooling chamber.

Hereinafter, "microwave" in a preferable mode is used as "high-frequency wave".

In the microwave aging device, several minute openings configured to block microwaves and let air pass through may be formed in an interior wall of the aging chamber.

In the microwave aging device, the several minute openings may be formed in each of a plurality of interior walls of the aging chamber.

In the microwave aging device, the aging chamber may be comprised of a plurality of aging chambers.

In the microwave aging device, the controller may be configured to control operation of the microwave oscillating unit to make an inner temperature of the food higher than a surface temperature of the food.

In the microwave aging device, the controller may be configured to automatically control operation of the microwave oscillating unit to make the inner temperature of the food equal to or higher than 5° C. during aging.

In the microwave aging device, the controller may be configured to automatically control operation of the cooler and/or the blower fan to make the surface temperature of the food lower than 5° C. during aging.

In the microwave aging device, the controller may be configured to automatically control operation of the microwave oscillating unit, the cooler, and the blower fan to make a difference in temperature between the surface temperature and the inner temperature of the food equal to or larger than 3° C. during aging.

In the microwave aging device, the microwave oscillating unit may be configured to perform microwave irradiation for one hour or more during aging.

In the microwave aging device, the controller may be configured to cause the microwave oscillating unit to perform microwave irradiation for a certain duration and suspend microwave irradiation for a certain duration repeatedly during aging.

In the microwave aging device, the cooling unit may include a UV lamp disposed in the cooling chamber.

A microwave aging method according to the present invention is a microwave aging method for aging food using a microwave and includes, through heating an inside of the food by microwave irradiation and cooling a surface of the food by blowing cold air simultaneously, making an inner temperature of the food higher than a surface temperature of the food to age the food.

In the microwave aging method, the microwave irradiation and the blowing of cold air may be performed to make the inner temperature of the food equal to or higher than 5° C., the surface temperature of the food lower than 5° C., and a difference in temperature between the surface temperature and the inner temperature of the food equal to or larger than 3° C.

In the microwave aging method, the food may be meat or seafood. Further, the food may be a foodstuff containing salt and, more specifically, may be selected from a ham and a cheese.

Furthermore, the food may be a foodstuff in a liquid, preferably in a liquid without microwave absorption, more specifically in an edible vegetable oil.

Advantageous Effects of Invention

According to the present invention, it is possible to make an inner temperature of food higher than a surface temperature of the food during aging, and therefore to shorten an aging period as well as to suppress bacterial proliferation on the surface of the food and reduce an amount of trimming.

BRIEF DESCRIPTION OF THE DRAWINGS

FIG. 1 is a configuration diagram of a microwave aging device according to a first embodiment.

FIG. 2 is a configuration diagram of a microwave aging device according to a second embodiment.

FIG. 3 is a configuration diagram of a microwave aging device according to a third embodiment.

FIG. 4 is a configuration diagram of a cavity according to the third embodiment.

FIG. 5 is a table showing measurement results of amino acid content on each day of aging in the presence of continuous microwave irradiation.

FIG. 6 is a graph showing the measurement results in FIG. 5.

FIG. 7 is a table showing measurement results of amino acid content in each aging condition.

FIG. 8 is a graph showing the measurement results in FIG. 7.

FIG. 9 is a graph showing measurement results of glutamic acid content in each aging condition.

FIG. 10 is a diagram for explaining a test condition for a sensory test.

FIG. 11 is a graph showing results of the sensory test.

FIG. 12 is a diagram explaining a microwave aging experiment and a comparative experiment by comparison in an embodiment example using a raw ham.

FIG. 13 is a diagram explaining a microwave aging experiment and a comparative experiment by comparison in an aging experiment in a state of being immersed in an olive oil. The figure includes a diagram of a typical microwave aging experiment in a state without plastic wrap as a reference diagram.

MODE FOR CARRYING OUT THE INVENTION

<<Food to be Aged>>

Aging is improvement of a state of food under a certain condition. Depending on a type of food, there are various aging mechanisms such as fermentation by microbial enzyme action, action of enzyme in food, mutual chemical reaction between constituents of food and a container, and physical change in a constituent of food. Briefly, aging is letting food stand to make it tasty. In the mechanisms, denseness increases while water is lost, and amino acid as an umami component increases severalfold. Aging is leaving food for a long time to let color, taste, fragrance, firmness, and the like of the food change, and to render the food favorable. In aging, various ingenuity is exercised, for example, conditions of temperature, time, and the like are set, to turn the change in flavor into improvement in quality. Umami of aged meat is increased due to decomposition of meat protein. Color of miso or soy sauce turns brown due to chemical reaction of amino acid or reduction sugar in the food, that is, Maillard reaction. This reaction also yields fragrant savor. Whisky absorbs a barrel constituent while being stored in a barrel, and turns golden brown. Balance among umami of amino acid resulting from decomposition of ingredients in the process of fermentation or aging, sweetness of sugar, and added salt is determinant. A device and a method of the present invention has enabled reproduction of the aged flavor without relying on experience and intuition and without spending much time. The present invention will be described using edible meat, especially beef, ham, and cheese as examples of foods to be aged. However, foods that can be aged by the microwave aging device according to the present invention are not limited thereto, and edible meat other than beef, seafood, ham, sausage, cheese, vegetables, noodles, bread, and the like are also applicable. In aging, to turn the change in flavor into improvement in quality, it is possible to contrive to immerse a foodstuff in a liquid, preferably in a liquid without microwave absorption (for example, an edible vegetable oil such as an olive oil), and set a temperature condition.

First Embodiment

FIG. 1 is a configuration diagram of a microwave aging device according to a first embodiment. A microwave aging device 1 according to the present embodiment is a device suitable for dry aging, and as shown in FIG. 1, includes a cooling unit 10, a microwave oscillating unit 20, a microwave aging unit 30, a controller 40, and a UV lamp 50. As shown in FIG. 1, the microwave aging device 1 has the microwave aging unit 30, the controller 40, and the UV lamp 50 inside the cooling unit 10. Food to be aged is meat, seafood, vegetables, noodles, or bread.

The cooling unit 10 is a device that cools the inner space of the cooling unit 10 with cold air. As shown in FIG. 1, the cooling unit 10 has a cooler 11, a first fan 12, a cooling chamber 13, and a cooling chamber door 14 not shown. In the present embodiment, the cooler 11 generates cold air by exchanging heat with the outside, and the first fan 12 blows the generated cold air into the cooling chamber 13 inside the cooling unit 10. This can lower the temperature in the cooling chamber 13. As described later, the controller 40 appropriately controls operation of the microwave oscillating unit 20 and the like and the temperature in the cooling chamber 13 to make a surface temperature of the food to be aged lower than an inner temperature of the food. Further, a user can open the cooling chamber door 14 to put the food to be aged in or take it out from the microwave aging unit 30 disposed in the cooling chamber 13.

The microwave oscillating unit 20 generates a microwave for irradiating the food M. As the microwave oscillating unit 20, an oscillator using a magnetron may be used. However, in the present embodiment, a solid-state oscillator is used, the solid-state oscillator using a semiconductor element that can achieve high frequency and high output stability compared to a magnetron. The microwave oscillating unit 20 generates microwaves while continuously changing their frequencies between 2.4 to 2.5 GHz. The microwaves generated by the microwave oscillating unit 20 are emitted from an irradiation port 31 of the microwave aging unit 30 via a cable 21. The continuous change of the microwave frequency between 2.4 to 2.5 GHz results in uniform electromagnetic field distribution in the microwave aging unit 30, which makes it possible to irradiate the food M with uniform microwave distribution and promote uniform heating (uniform aging) of the food M.

As shown in FIG. 1, the microwave aging unit 30 includes the irradiation port 31, a second fan 32, an aging chamber 33, and an aging chamber door 34 not shown. A user can open the aging chamber door 34 to put the food M to be aged in and take it out from the aging chamber 33.

The aging chamber 33 is a cavity of which inner surfaces (interior walls) are all equipped with a reflection board for reflecting microwaves. In an upper inner surface of the aging chamber 33, the irradiation port 31 is disposed through which microwaves generated by the microwave oscillating unit 20 are emitted into the aging chamber 33. In the present embodiment, a small patch antenna (planar antenna) with a high gain is attached to the irradiation port 31, and the microwaves generated by the microwave oscillating unit 20 are emitted into the aging chamber 33 by the antenna.

In the aging chamber 33, a shelf made of microwave permeable material such as Teflon (registered trademark) and polypropylene may be disposed.

The second fan 32 blows the cold air in the cooling chamber 13 into the aging chamber 33. The second fan 32 employs a fan capable of blowing air at an air volume suitable for dry aging (for example, 0.5 to 10.0 m/sec). As shown in FIG. 1, in the present embodiment, the second fan 32 is attached to the outside of the aging chamber 33, and first minute openings 35 are formed in a side wall of the aging chamber 33 to which the second fan 32 is attached. The size of the first minute openings 35 is shorter than the wavelengths of microwaves and, for example, in the present embodiment, is 10 mm or smaller in diameter. The first minute openings 35 block the microwaves emitted into the aging chamber 33 and let only the cold air blown by the second fan 32 pass through. Further, second minute openings 36 with a similar diameter to the first minute openings 35 are formed in a side wall of the aging chamber 33 opposed to the first minute openings 35. The second minute openings 36 block the microwaves emitted into the aging chamber 33, but the air heated by heat exchange with the food M in the aging chamber 33 passes through the second minute openings 36 and is exhausted into the cooling chamber 13. The first minute openings 35 and the second minute openings 36 may be formed in an area occupying a large part of one or more side walls to enhance airflow. Moreover, the aging chamber 33 may be constituted using punching metal in which the first minute openings 35 and the second minute openings 36 are formed in advance, and stainless board having openings of φ 10 mm may be used as such punching metal.

In the controller 40, a program for temperature control is embedded which makes the surface temperature and the inner temperature of the food M to be aged respective predetermined temperatures. Specifically, through controlling operation of the microwave oscillating unit 20, the cooler 11, the first fan 12, and the second fan 32, the controller 40 controls output levels of microwaves from the microwave oscillating unit 20, a temperature of cold air from the cooler 11, and volumes of air blown by the first fan 12 and the second fan 32 to perform the temperature control. For example, through raising output levels of microwaves from the microwave oscillating unit 20, the controller 40 can raise the inner temperature of the food M, and through lowering the temperature of the cold air from the cooler 11 or increasing the volumes of air blown by the first fan 12 and the second fan 32, the controller 40 can lower the surface temperature of the food M. The controller 40 may be configured to control the microwave oscillating unit 20 such that microwave irradiation is switched ON and OFF at regular intervals (for example, every few hours). For example, the controller 40 may control the microwave oscillating unit 20 such that microwave irradiation is performed for three hours and then microwave irradiation is suspended for three hours, and similarly, irradiation with microwave and suspension of the irradiation occur alternately every three hours, for example, for the whole seven days of an aging period.

Additionally, the controller 40 may be connected with temperature sensors that measure the inner temperature and the surface temperature of the food M (for example, Fiber Optic Thermometer (manufactured by Anritsu Meter Co., LTD.) capable of making a contact temperature measurement even in an environment subject to a microwave and a radiation temperature sensor that makes a contactless measurement of intensity of an infrared ray or visible light), and may be configured to appropriately perform the temperature control based on measurement results obtained by the temperature sensors.

Further, the controller 40 may be configured to store, in advance through a test, relationship between weights and water amounts of the food M and output levels of microwaves from the microwave oscillating unit 20, temperatures of cold air from the cooler 11, and volumes of air blown by the first fan 12 and the second fan 32 for making the surface temperature and the inner temperature of the food M predetermined temperatures; and to control the output levels of microwaves from the microwave oscillating unit 20, the temperature of the cold air from the cooler 11, and the volumes of air blown by the first fan 12 and the second fan 32 depending on a weight and a water amount of the food M obtained from a weight scale and a contactless moisture meter disposed in the aging chamber 33. In this case, it is disclosed that the controller 40 includes an input device such as an operation button or a touch panel, and in response to an input of information of food to be aged such as a type of the food (for example, beef, pork, or chicken) and a size of the food, automatically performs control to make the surface temperature of the food higher than the inner temperature of the food.

Herein, since a microwave heats even the inside of food by dielectric heating, the microwave aging unit 30 can heat not only the surface of the food M but also the inside of the food M when performing microwave irradiation. Warming the inside of the food M can promote aging of the food M, but warming the surface of the food M would cause proliferation of bacteria adhered to the surface of the food M. To cope with it, in the microwave aging device 1 according to the present embodiment, the cooling mechanism, that is, the cooling unit 10 and the second fan 32 operate to cool the surface of the food M, which allows for suppressing the proliferation of bacteria adhered to the surface of the food M.

Especially, in the microwave aging device 1 according to the present embodiment, the heating mechanism (the microwave oscillating unit 20 and microwave aging unit 30) heats the food M and, at the same time, the cooling mechanism (the cooling unit 10 and the second fan 32) cools the surface of the food M, and the controller 40 controls operation of the heating mechanism and the cooling mechanism to make the inner temperature of the food M higher than the surface temperature of the food M. More specifically, the controller 40 performs temperature control to make the inner temperature of the food M equal to or higher than 5° C., and the surface temperature of the food M lower than 5° C. (preferably, 0 to 4° C.), or more preferably, controls the output of the microwave oscillating unit 20, the temperature of cold air from the cooler 11, and the volumes of air blown by the first fan 12 and the second fan 32 to make a difference between the inner temperature and the surface temperature of the food M equal to 3° C. or larger. Thus, in the microwave aging device 1, during aging of the food M, it is possible to promote the aging of the food M and suppress bacterial proliferation on the surface of the food M. Microwave irradiation does not have to be continuously performed throughout the aging of the food M, and may be performed for at least one hour or more (preferably for three hours or more, more preferably for five hours or more).

The UV lamp 50 is a device that generates an ultraviolet ray. In the present embodiment, a part (at least a UV lamp 50 side part) of walls of the aging chamber 33 is configured to let ultraviolet rays pass through, and the surface of the food M placed in the aging chamber 33 may be irradiated with an ultraviolet ray generated by the UV lamp 50 during aging of the food M. By thus irradiating the surface of the food M with an ultraviolet ray during aging, proliferation of bacteria resident on the surface of the food M can be further suppressed. Note that the controller 40 can also control operation of the UV lamp 50. For example, the controller 40 can control the UV lamp 50 to emit an ultraviolet ray for a certain duration (for example, a few hours) from the time when aging is started or the time when the aging chamber door 34 is closed (after having been opened).

As described above, the microwave aging device 1 according to the present embodiment includes the microwave aging unit 30 that irradiates the food M with a microwave and the cooling unit 10 that cools the surface of the food M, and is configured to simultaneously heat the inside of the food by the microwave aging unit 30 and cool the surface of the food by the cooling unit 10 and the second fan 32, thereby making the inner temperature of the food M higher than the surface temperature of the food M to age the food M. This makes it possible to suppress proliferation of bacteria resident on the surface of the food M while promoting the aging of the food M. Further, by suppressing proliferation of bacteria resident on the surface of the food M and promoting the aging of the food M, an amount of the surface of the food M to be pared away, that is, trimmed, can be reduced and a yield rate can also be improved.

Additionally, by irradiating the food M with a microwave for aging, bacteria resident on the surface of the food M can be damaged by the microwave and thus proliferation of the bacteria resident on the surface of the food M can be further suppressed. It is also known that microwaves enhance activity of enzyme such as protease, and thus irradiating the food M with a microwave for aging can further promote the aging of the food M. In this way, the microwave aging device 1 according to the present embodiment can promote the aging of the food M while suppressing proliferation of bacteria resident on the surface of the food M, also bringing an advantageous effect that aging of chicken and pork, which has typically been difficult due to quick decay, can be easily carried out.

Further, the controller 40 controls the output levels of microwaves from the microwave oscillating unit 20, the temperature of cold air from the cooler 11, and the volumes of air blown by the first fan 12 and the second fan 32 during aging of the food M through heating of the inside of the food by the microwave aging unit 30 to make the inner temperature of the food M equal to or higher than 5° C. and the surface temperature of the food M lower than 5° C., and more preferably, to make a difference between the inner temperature and the surface temperature of the food M equal to 3° C. or larger. This makes it possible to promote the aging of the food M while suppressing proliferation of bacteria resident on the surface of the food M more effectively.

Second Embodiment

Next, a microwave aging device 1a according to a second embodiment will be described. FIG. 2 is a configuration diagram showing an example of the microwave aging device 1a according to the second embodiment. As shown in FIG. 2, the microwave aging device 1a according to the second embodiment is similar to the microwave aging device 1 according to the first embodiment except that an aging chamber door 34 of an aging chamber 33 has a choke structure and can be opened and closed from the outside. The same structures as those in the first embodiment are denoted by the same reference symbols and explanations thereof are omitted.

As shown in FIG. 2, in the microwave aging device 1a according to the second embodiment, the aging chamber door 34 of the aging chamber 33 can be opened and closed directly from the outside. Further, in the second embodiment, the aging chamber door 34 of the aging chamber 33 has a choke structure to prevent a microwave from leaking to the outside. The choke structure can be formed as a publicly known structure.

Thus, the microwave aging device 1a according to the second embodiment makes it possible to put food M in and take it out from the aging chamber 33 directly from the outside. Further, in the second embodiment, since the aging chamber door 34 has a choke structure, it is possible to effectively prevent a microwave from leaking to the outside.

Third Embodiment

Next, a microwave aging device 1b according to a third embodiment will be described. FIG. 3 is a perspective view showing an example of the microwave aging device 1*b* according to the third embodiment, and FIG. 4 is a perspective view showing an example of a microwave aging unit 30*a* according to the third embodiment. As shown in FIG. 3, a cooling unit 10 has two cooling chambers 13 in each of which a microwave aging unit 30*a* (an aging chamber 33) is disposed.

As shown in FIG. 4 (A), the microwave aging unit 30*a* has a two-stage structure in which the aging chamber 33 is divided into upper and lower stages by a net plate 37, and food M can be placed in each of the upper and lower stages. As shown in FIG. 4 (B), in the microwave aging unit 30*a* according to the third embodiment, a second fan 32 is attached to the back surface of each of the stages, and operates to blow cold air in the cooling chamber 13 into the aging chamber 33. Further, minute openings 36 are formed in a large part of both side surfaces of the microwave aging unit 30*a*, and the air that has been blown from the cooling chamber 13 into the aging chamber 33 and then has exchanged heat with the food M is exhausted into the cooling chamber 13 through the minute openings 36, which can effectively lower the surface temperature of the food M.

In the third embodiment, the foreside of the microwave aging unit 30*a* is open, and a choke structure 38 is formed on the opening edge. As shown in FIG. 3, a cooling chamber door of the cooling chamber 13 is also used as an aging chamber door 34 of the aging chamber 33, and the choke structure 38 can effectively prevent a microwave from leaking to the outside. The door face may be formed to have a double structure using a punching metal plate and a transparent plate so that aging progression degree or the like of the food M inside the aging chamber 33 can be checked without opening the door while microwave leakage prevention and heat insulation functions are kept. Material of the transparent plate is not particularly limited and, for example, may be glass, polycarbonate resin, or the like. Further, the structure may be formed to have two transparent plates laminated with an air layer therebetween, which improves the heat insulation function.

In the third embodiment, an irradiation port 31 and a lighting unit 39 are arranged on an upper surface of the microwave aging unit 30*a*. As in the first embodiment, microwave irradiation is performed into the aging chamber 33 through the irradiation port 31. The lighting unit 39 has an LED light source that lights the inside of the aging chamber 33 and, for example, lights the inside of the aging chamber 33 when the aging chamber door 34 is opened.

As described above, since the microwave aging device 1*b* according to the third embodiment has the two cooling chambers 13 and the two aging chambers 33, it is possible to increase an amount of food M to be aged at once. Additionally, since the aging chamber 33 is divided into the upper and lower stages and the second fan 32 is included in each of the stages, even when a large amount of food M is to be aged, it is possible to appropriately lower the surface temperature of the food M. Further, in the third embodiment, since a commercially available refrigerator may be utilized as the cooling unit 10, it is also possible to reduce production cost.

The present invention will be described in more detail with reference to embodiment examples. The present invention is not limited to these embodiment examples.

EMBODIMENT EXAMPLE 1

The inventors carried out the following tests to verify an aging effect of food obtained from the microwave aging device according to the present invention. Specifically, the inventors built a prototype with the same configuration as the microwave aging device 1 according to the first embodiment and carried out each test.

In the following practical examples 1 to 3, approximately 300 g of beef round (approximately 700 g in practical example 4) was put in the microwave aging unit and irradiated with a microwave of 100 W or lower for the tests. In the tests, the output levels of microwaves from the microwave oscillator, the temperature of cold air from the cooler, and the volumes of air blown by the first fan and the second fan were controlled so that the temperature inside the cooling unit 10 would be −2° C., the surface temperature of the beef round would be −1 to +2° C., and the inner temperature of the beef round would be +8° C. The volume of air blown by the second fan was controlled within a range of 0.5 to 1.0 m/sec.

PRACTICAL EXAMPLE 1

First, continuous microwave irradiation was performed for nine days of aging, and the amino acid content was measured on each day of aging. The measurement results are shown in FIGS. 5 and 6. FIG. 5 shows the measurement results of the amino acid content on each day of aging in practical example 1, and FIG. 6 is a graph of the measurement results shown in FIG. 5. Focusing on the total amount of amino acid, the total amount of amino acid at the beginning (on the zeroth day) was 375.4 mg/100 g, the total amount of amino acid on the sixth day of aging was 745.9 mg/100 g, and the total amount of amino acid on the ninth day of aging was 1128.1 mg/100 g. As can be seen from these results, the microwave irradiation to a beef round caused the total amount of amino acid to increase about twofold in six days of aging, and about threefold in nine days of aging.

PRACTICAL EXAMPLE 2

Next, in practical example 2, amino acid contents after seven-day aging were measured for the following cases: (A) a beef round before aging; (B) a beef round aged for seven days without microwave irradiation; (C) a beef round aged for seven days with microwave irradiation just for six hours from the beginning of the aging; and (D) a beef round aged for seven days with microwave irradiation just for 20 hours from the beginning of the aging (as for (A), the amino acid content of the beef round before aging was measured). FIG. 7 shows the measurement results of the amino acid contents for (A) to (D) described above in practical example 2, and FIG. 8 is a graph of the measurement results shown in FIG. 7.

Focusing on the total amount of amino acid, as shown in FIGS. 7 and 8, the total amount of amino acid of (B) the beef round aged for seven days without microwave irradiation was increased by 44.9 mg/100 g with respect to that of (A) the beef round before aging. Meanwhile, the total amount of amino acid of (C) the beef round aged for seven days with microwave irradiation just for six hours was increased by 96.5 mg/100 g, and the total amount of amino acid of (D) the beef round aged for seven days with microwave irradiation just for 20 hours was increased by 232.5 mg/100 g, with respect to that of (A) the beef round before aging. It thus turned out that the total amount of amino acid was significantly increased in each of the cases of (C) seven-day aging with microwave irradiation just for six hours and (D) seven-day aging with microwave irradiation just for 20 hours as compared with that in the case of (B) seven-day aging without microwave irradiation. It also turned out that a total amount of amino acid tends to get larger as duration of microwave irradiation gets longer.

PRACTICAL EXAMPLE 3

Next, FIG. 9 shows measurement results of glutamic acid content measured on each day of seven-day aging for the cases of: a typical aging method in which microwave irradiation is not performed; and an aging method according to the present invention in which microwave irradiation is performed. Glutamic acid is amino acid relevant to umami and may also be an index indicating umami of beef. Note that the beef that was aged by the typical aging method and the beef that was aged with microwave irradiation according to the present embodiment were of different types, and thus, as shown in FIG. 9, contained different amounts of glutamic acid at the beginning of aging.

As shown in FIG. 9, the glutamic acid content was significantly increased in the presence of microwave irradiation as compared with that in the absence of microwave irradiation. Specifically, while the glutamic acid content resulting from seven-day aging by the conventional aging method without microwave irradiation increased 1.52-fold, the glutamic acid content resulting from seven-day aging by the aging method with microwave irradiation according to the present embodiment exhibited a significant increase of 2.60-fold. It turned out that an increment (increasing rate) of glutamic acid tends to get larger as an aging period progresses in the presence of microwave irradiation.

PRACTICAL EXAMPLE 4

Next, a sensory test was carried out for (E) a beef round aged for seven days with continuous microwave irradiation and for (F), (G) beef rounds aged for seven days without microwave irradiation. FIG. 10 is a diagram for explaining an aging condition of each sample in practical example 4. As shown in FIG. 10, in the case of (E) the beef round aged for seven days with continuous microwave irradiation, aging was carried out under such temperature control that the temperature of the cooling chamber would be −2° C., the surface temperature of the beef round would be 2° C., and the inner temperature of the beef round would be 8° C. As for the cases of the beef rounds aged for seven days without microwave irradiation, (F) aging was carried out under such temperature control that the temperature of the cooling chamber would be −2° C., the surface temperature of the beef round would be −2° C., and the inner temperature of the beef round would be −2° C., and (G) aging was carried out under such temperature control that the temperature of the cooling chamber would be 8° C., the surface temperature of the beef round would be 8° C., and the inner temperature of the beef round would be 8° C.

FIG. 11 shows results of the sensory test in practical example 4. The sensory test was carried out by three connoisseurs in Japan Meat Science & Technology Institute. In the sensory test, a beef round without aging was assumed as a reference (zero points), and each of items including acrid odor, offensive taste, aged flavor, richness, umami, juiciness, tenderness, and total was evaluated on a seven-point scale from −3 points to +3 points.

As a result, for (E) the beef round aged for seven days with continuous microwave irradiation and (F), (G) the beef rounds aged for seven days without microwave irradiation, the evaluations of aged flavor, richness, umami, and juiciness marked higher points and the total evaluation also marked higher points as compared with those for the beef round without aging (reference). Comparing (E) the beef round aged for seven days with continuous microwave irradiation with (F), (G) the beef rounds aged for seven days without microwave irradiation, the evaluations of richness, umami, juiciness, and tenderness marked higher points and the total evaluation also marked higher points for (E) the beef round aged for seven days with continuous microwave irradiation. Especially, the evaluations of richness and umami marked significantly high points for (E) the beef round aged for seven days with continuous microwave irradiation as compared with those for the beef round without aging (reference).

Thus, as compared with (F), (G) the beef rounds aged for seven days without microwave irradiation, (E) the beef round aged for seven days with continuous microwave irradiation exhibited increases in richness, umami, juiciness, and tenderness from the sensory viewpoint, and it turned out that a beef round in such a case becomes tasty.

Meanwhile, bacteria examination was conducted for the aged beef rounds of (E) to (G) in practical example 4, and it was confirmed that the numbers of E. Coli were less than 30 (per 100 g) and the numbers of Enterobacteriaceae family were less than 10 (cfu/g).

EMBODIMENT EXAMPLE 2

This is an embodiment example using raw ham.

In this embodiment example, the microwave aging was applied to a ham or a cheese. FIG. 12 shows a diagram explaining a microwave aging experiment and a comparative experiment by comparison.

Expected effects are as follows.

It is known that, when salt as electrolyte is added to a foodstuff containing water, the microwave absorption increases. Microwave irradiation to a foodstuff containing salt causes a portion containing much salt to efficiently absorb microwaves and thus the salt to disperse according to a salt concentration gradient. Consequently, since the unevenness of the salt concentration inside the foodstuff is rapidly smoothed out, it can be expected that mild saltiness is experienced.

SPECIFIC PRACTICAL EXAMPLES (1) Microwave Aging Experiment 300 g of raw ham after twelve-month aging (ready-made product) was covered with food wrap film, and aged for five days under such temperature control that the temperature of the cooling chamber would be 0° C., the surface temperature of the ham would be 3° C., and the inner temperature of the raw ham would be 10° C.

(2) Comparative Experiment 300 g of raw ham after twelve-month aging was covered with food wrap film, and aged without microwave irradiation for five days in a refrigerator in which the temperature was 3° C.

(3) Sensory Evaluation Test

Table 1 shows tasting results of the raw hams. As shown in Table 1, when ten testers compared the hams by eating, (1) obtained better ratings than (2) in saltiness from nine testers, in mildness from eight testers, and in total from eight testers.

A chef of an Italian restaurant indicated an evaluation that mild saltiness similar to a raw ham after eighteen-month aging (ready-made product) was experienced.

(4) Application to Others

The present invention can be widely applied to foodstuffs containing salt such as miso and soy sauce.

TABLE 1

Tasting results of raw hams

| Name | Saltiness | Mildness | Total | Comment |
|---|---|---|---|---|
| 1 | A | 1 | 1 | 1 | Especially excellent in mildness. |
| 2 | B | 1 | 1 | 1 | Taste has become uniform. |
| 3 | C | 1 | 1 | 2 | There was a difference in taste. |
| 4 | D | 2 | 2 | 2 | Difference was obscure. |
| 5 | E | 1 | 1 | 1 | Mildness was excellent. |
| 6 | F | 1 | 1 | 1 | Mildness of saltiness was outstanding. |
| 7 | G | 1 | 1 | 1 | |
| 8 | H | 1 | 1 | 1 | Tasted mild. |
| 9 | I | 1 | 1 | 1 | No harsh taste was perceived. |
| 0 | J | 1 | 2 | 1 | |

*Rating on 4-point scale, assuming 2 points for beef round set in refrigerator (1: Excellent, 2: Good, 3: Fair, 4: Poor)

EMBODIMENT EXAMPLE 3

In this embodiment example, an aging experiment in a state of being immersed in an olive oil was carried out. FIG. 13 shows a diagram explaining a microwave aging experiment and a comparative experiment by comparison. FIG. 13 also shows a diagram of a typical microwave aging experiment in a state without plastic wrap as a reference diagram. Expected effects are as follows.

(i) By using a liquid, preferably a liquid without microwave absorption, it is possible to directly heat a foodstuff with microwaves in a state where the foodstuff is in such a liquid with good heat conductivity arranged around it. This allows for more efficient cooling of a surface of the foodstuff than using cold air in the cooling chamber.

(ii) When a liquid insoluble in water such as an olive oil is used, it is possible to suppress elution of water from the foodstuff, and thus prevent decrease in a yield rate since a water content ratio of the foodstuff does not change before and after the aging. Further, it is also possible to prevent oxidation of the surface of the foodstuff, and thus prevent decrease in the yield rate since paring away, that is, trimming, of the surface of the foodstuff is not necessary.

(iii) A foodstuff in which water has been reduced is sometimes overcooked, and entails difficulty in adjusting doneness level in cooking. In contrast, the foodstuff that has been processed by the present method has no change in water content rate, which allows for easy cooking.

SPECIFIC PRACTICAL EXAMPLES (1) Microwave Aging Experiment 300 g of beef round of A-5 ranked Japanese Black Cattle was immersed in 500 ml of olive oil, and aged for five days under such temperature control that the temperature of the olive oil would be 3° C. and the inner temperature of the meat would be 10° C.

(2) Comparative Experiment 300 g of beef round was covered with food wrap film, and aged without microwave irradiation for five days in a refrigerator in which the temperature was 3° C.

The beef in the microwave aging experiment and the beef in the comparative experiment exhibited no change in weight after the process.

(3) Sensory Evaluation Test

Table 2 shows tasting results of the meat immersed in the olive oil. As shown in Table 2, when ten testers compared the beefs by eating, (1) obtained better ratings than (2) in tenderness from seven testers, in taste from eight testers, and in total from eight testers.

(4) Application to Others

As the liquid, or as a liquid without microwave absorption, preferably an edible vegetable oil, another edible oil may be used instead of an olive oil.

Edible vegetable oils fall into categories according to the sources, such as oils extracted from oilseeds (soy, rapeseed, sesame, cottonseed, linseed, and the like), oils extracted from agricultural by-products (rice bran and corn germ), and oils imported from abroad (palm oil, olive oil, sunflower oil, castor oil, and the like), and any of them can be used depending on food to be aged.

TABLE 2

Tasting results of meat in olive oil

| | Name | Tenderness | Taste | Total | Comment |
|---|---|---|---|---|---|
| 1 | A | 1 | 1 | 1 | Fat has become sweet. |
| 2 | B | 1 | 1 | 1 | Odor has disappeared. |
| 3 | C | 1 | I | 1 | Delicious |
| 4 | D | 1 | 1 | 1 | Fat was tasty. |
| 5 | E | 2 | 2 | 2 | No change was perceived. |
| 6 | F | 2 | 1 | 4 | Tasted excellent. |
| 7 | G | 2 | 1 | 1 | Taste of meat has been brought out. |
| 8 | H | 1 | 1 | 1 | Tasted rich. |
| 9 | I | 1 | 2 | 2 | |
| 10 | J | 1 | 1 | 4 | |

*Rating on 4-point scale, assuming 2 points for beef round set in refrigerator (1: Excellent, 2: Good, 3: Fair, 4: Poor)

Preferable embodiments and embodiment examples of the present invention have been described above. However, the technical scope of the present invention is not limited to the descriptions of the embodiments and the embodiment examples. Various alterations and modifications can be applied to the embodiments and the embodiment examples, and such altered or modified modes also fall within the technical scope of the present invention.

In addition to the embodiments and the embodiment examples, a measuring scale that measures a weight of food M placed in the aging chamber 33 may be installed at the bottom of the aging chamber 33. In this case, aging degree of the food may be determined based on a change in weight of the food and presented to a user. A contactless moisture meter may be further included, and the aging degree of the food may be determined depending on a change in weight of the food and a change in water content of the food.

Further, in the embodiments and the embodiment examples, a configuration in which frequencies of microwaves are set within 2.4 to 2.5 GHz (ISM band) is shown as an example. However, the present invention is not limited to this configuration, and frequencies in a range of, for example, 300 MHz to 300 GHz may also be used.

LIST OF REFERENCE SYMBOLS

1, 1a, 1b microwave aging device
10 cooling unit
11 cooler
12 first fan
13 cooling chamber
20 microwave oscillating unit
21 cable 30, 30a microwave aging unit
31 irradiation port
32 second fan
33 aging chamber
34 aging chamber door
35 first minute openings
36 second minute openings
37 net plate
38 choke structure
39 lighting unit
40 controller
50 UV lamp

The invention claimed is:

1. A microwave aging device comprising:
    a microwave aging unit having an aging chamber configured to store food, an irradiation port through which microwave irradiation is performed into the aging chamber, and a blower fan configured to blow air into the aging chamber;
    a cooling unit having a cooling chamber;
    a microwave oscillating unit connected to the irradiation port; and
    a controller, wherein
    the aging chamber is arranged in the cooling chamber, and several minute openings configured to block microwaves and let air pass through are formed in an interior wall of the aging chamber.

2. The microwave aging device according to claim 1, wherein the several minute openings are formed in each of a plurality of interior walls of the aging chamber.

3. The microwave aging device according to claim 1, wherein the aging chamber is comprised of a plurality of aging chambers.

4. The microwave aging device according to claim 1, wherein the controller is configured to control operation of the microwave oscillating unit to make an inner temperature of the food higher than a surface temperature of the food.

5. The microwave aging device according to claim 4, wherein the controller is configured to automatically control operation of the microwave oscillating unit to make the inner temperature of the food equal to or higher than 5° C. during aging.

6. The microwave aging device according to claim 4, wherein the cooling unit includes a cooler which generates cold air by exchanging heat with the outside, and the controller is configured to automatically control operation of the cooler and/or the blower fan to make the surface temperature of the food lower than 5° C. during aging.

7. The microwave aging device according to claim 4, wherein the cooling unit includes a cooler which generates cold air by exchanging heat with the outside, and the controller is configured to automatically control operation of the microwave oscillating unit, the cooler, and the blower fan to make a difference in temperature between the surface temperature and the inner temperature of the food equal to or larger than 3° C. during aging.

8. The microwave aging device according to claim 1, wherein the microwave oscillating unit is configured to perform microwave irradiation for one hour or more during aging.

9. The microwave aging device according to claim 1, wherein the controller is configured to cause the microwave oscillating unit to perform microwave irradiation for a certain duration and suspend microwave irradiation for a certain duration repeatedly during aging.

10. The microwave aging device according to claim 1, wherein the cooling unit comprises a UV lamp disposed in the cooling chamber.

11. A microwave aging method for aging food using a microwave, comprising:
    through heating an inside of the food by microwave irradiation; and
    cooling a surface of the food by blowing cold air simultaneously so as to make an inner temperature of the food higher than a surface temperature of the food to age the food,
    wherein the microwave irradiation and the blowing of cold air are performed to make the inner temperature of the food equal to or higher than 5° C., the surface temperature of the food lower than 5° C., and a difference in temperature between the surface temperature and the inner temperature of the food equal to or larger than 3° C.

12. The microwave aging method according to claim 11, wherein the food is meat or seafood.

13. The microwave aging method according to claim 11, wherein the food is a foodstuff containing salt.

14. The microwave aging method according to claim 13, wherein the foodstuff containing salt is selected from a ham and a cheese.

15. The microwave aging method according to claim 11, wherein the food is a foodstuff in a liquid.

16. The microwave aging method according to claim 15, wherein the liquid is a liquid without microwave absorption.

17. The microwave aging method according to claim 16, wherein the liquid without microwave absorption is an edible vegetable oil.

* * * * *